(12) United States Patent
Bühn et al.

(10) Patent No.: US 12,320,414 B2
(45) Date of Patent: Jun. 3, 2025

(54) GEAR SYSTEM HAVING A HOUSING PART

(71) Applicant: SEW-EURODRIVE GMBH & CO. KG, Bruchsal (DE)

(72) Inventors: Oliver Bühn, Kraichtal (DE); Martin Kerschbaum, Karlsruhe (DE); Miki Tegeltija, Karlsdorf-Neuthard (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 105 days.

(21) Appl. No.: 18/033,711

(22) PCT Filed: Oct. 13, 2021

(86) PCT No.: PCT/EP2021/078369
§ 371 (c)(1),
(2) Date: Apr. 25, 2023

(87) PCT Pub. No.: WO2022/089942
PCT Pub. Date: May 5, 2022

(65) Prior Publication Data
US 2023/0400089 A1 Dec. 14, 2023

(30) Foreign Application Priority Data
Oct. 27, 2020 (DE) .......................... 102020006593.7

(51) Int. Cl.
*F16H 57/02* (2012.01)
*F16H 57/021* (2012.01)
(Continued)

(52) U.S. Cl.
CPC ......... *F16H 57/021* (2013.01); *F16H 57/029* (2013.01); *F16H 57/03* (2013.01);
(Continued)

(58) Field of Classification Search
CPC ...... F16H 57/021; F16H 57/029; F16H 57/03; F16H 57/031; F16H 2057/02034; F16H 2057/02086
See application file for complete search history.

(56) References Cited

U.S. PATENT DOCUMENTS 4,444,071 A * 4/1984 Guichard ................ F16H 1/225
29/434
4,838,123 A 6/1989 Matoba
(Continued)

FOREIGN PATENT DOCUMENTS

CN 211557066 U 9/2010
DE 102012010789 A1 12/2013
(Continued)

OTHER PUBLICATIONS

International Search Report issued in corresponding International Application No. PCT/EP2021/078369 dated Dec. 14, 2021, pp. 1-3, English Translation.
(Continued)

*Primary Examiner* — Adam D Rogers
(74) *Attorney, Agent, or Firm* — Carter, DeLuca & Farrell LLP

(57) ABSTRACT

A gear system includes a housing part. The housing part has a cylindrical inner wall which radially surrounds the wheel, e.g., toothed part, such as a gear, connected to the output shaft of the gear system for conjoint rotation. On the cylindrical inner wall are formed projections, which are spaced from each other in the circumferential direction, e.g., are spaced from each other at regular intervals, and which project radially inwards and extend axially. For example, the projections are longer in the axial direction than in the circumferential direction and in the radial direction.

26 Claims, 4 Drawing Sheets

(51) Int. Cl.
*F16H 57/029* (2012.01)
*F16H 57/03* (2012.01)
*F16H 57/031* (2012.01)

(52) U.S. Cl.
CPC . *F16H 57/031* (2013.01); *F16H 2057/02034* (2013.01); *F16H 2057/02086* (2013.01)

(56) References Cited

U.S. PATENT DOCUMENTS

| | | | |
|---|---|---|---|
| 9,810,309 B2 * | 11/2017 | Chen | F16H 57/021 |
| 10,240,669 B2 * | 3/2019 | Tegeltija | F16C 35/077 |
| 10,871,216 B2 * | 12/2020 | Tegeltija | F16H 57/038 |
| 11,316,399 B2 | 4/2022 | Kinjo | |
| 2018/0238426 A1 | 8/2018 | Hung | |
| 2020/0244140 A1 * | 7/2020 | Kinjo | H02K 5/22 |

FOREIGN PATENT DOCUMENTS

| | | | | |
|---|---|---|---|---|
| DE | 102018001086 A1 * | 8/2018 | | F16H 57/02 |
| DE | 102017203318 A1 | 9/2018 | | |
| EP | 2479454 A1 | 7/2012 | | |
| FR | 3063124 A3 | 8/2018 | | |
| JP | 2004150481 A | 5/2004 | | |
| WO | WO-2023227314 A1 * | 11/2023 | | F16H 57/02 |

OTHER PUBLICATIONS

International Report on Patentability issued in corresponding International Application No. PCT/EP2021/078369 dated May 2, 2023, pp. 1-8, English Translation.

\* cited by examiner

GEAR SYSTEM HAVING A HOUSING PART

FIELD OF THE INVENTION

The present invention relates to a gear system having a housing part.

BACKGROUND INFORMATION

In certain conventional systems, a gear system has a housing part which surrounds the oil-lubricated gear stage or stages of the gear system in a housing-forming and oil-tight manner.

A planetary gear unit is described in U.S. Pat. No. 4,838,123.

A transmission drive device is described in German Patent Document No. 10 2017 203 318.

SUMMARY

Example embodiments of the present invention provide a gear system that is, e.g., compact and conserves resources, i.e., is environmentally friendly.

According to an example embodiment of the present invention, in a gear system including a housing part, the housing part has a cylindrical inner wall which radially surrounds the wheel, e.g., toothed part, such as a gear, connected to the output shaft of the gear system for conjoint rotation. Projections are formed on the cylindrical inner wall which are spaced from each other in the circumferential direction, e.g., are spaced from each other at regular intervals, and which project radially inwards and extend axially. For example, the projections are longer in the axial direction than in the circumferential direction and in the radial direction.

An advantage is that the cylindrical inner wall only has to have a low wall thickness and still achieves a high level of stability by the projections. The cylindrical inner wall is arranged as a hollow cylinder and is arranged inside an outer wall region, e.g., a cuboid outer wall region. This makes it possible to fasten a cover part or flange part by screws and/or tie rods, e.g., radially between the cylindrical inner wall, i.e., the hollow cylinder, and the cuboid outer wall region. Thus, fastening is possible radially inside the outer wall region, i.e., in the protected area, which, however, does not have to be and/or is not filled with oil. Overall, this means that very little material and installation space is required for a highly stable gear system housing and that the gear system can therefore be manufactured in a manner that conserves resources and is thus environmentally friendly.

The outer wall region is spaced from the inner wall for increased safety. This is because oil does not leak out even if the outer wall region is damaged. The oil is arranged, for example, protected by a double wall.

According to example embodiments, a sealing surface connects to the cylindrical inner wall, and the sealing surface is formed as a conical surface section. For example, the axis of rotational symmetry of the conical surface section is aligned coaxially to the axis of rotation of the output shaft. An advantage is that the cover part can be connected tightly. The conical shape facilitates threading and centering the cover part to the housing cover.

According to example embodiments, the region covered by the projections in the axial direction adjoins or is spaced from the region covered by the sealing surface in the axial direction, but, for example, does not overlap with the region covered by the sealing surface in the axial direction. An advantage is that the sealing ring abuts the sealing surface and is axially limited by the projections.

According to example embodiments, a cover part has an annular protrusion, and the cover part is connected to the housing part such that the annular protrusion abuts the sealing surface. An advantage is that a high level of tightness can be achieved.

According to example embodiments, the annular protrusion has a conical surface region. For example, the annular protrusion has an outer conical surface region which abuts the inner conical sealing surface which abuts the inner cylindrical wall. The axis of rotational symmetry of the outer conical surface region is aligned coaxially to the axis of rotational symmetry of the inner conical sealing surface. An advantage is that threading and centering are facilitated and a tight connection is possible.

According to example embodiments, the cylindrical inner wall is radially surrounded by a cuboid outer wall of the housing part, and wall portions are arranged between the cylindrical inner wall and the cuboid outer wall. The wall portions are connected to the cylindrical inner wall and are connected to the cuboid outer wall. An advantage is that a high level of stability can be achieved with low material cost. In addition, the outer wall also protects the connection area, in which connection device(s) are arranged for connecting a cover part and a flange part. Thus, only a small volume has to be filled with oil and low material cost is required.

According to example embodiments, the radial distance between the cylindrical inner wall and the cuboid outer wall is variable in the circumferential direction between zero and a maximum value, e.g., periodically variable. An advantage is that the cylindrical inner wall is rigidly connected to the outer wall and is held stably by the outer wall.

According to example embodiments, on first wall areas, first dome areas are formed, in each of which either an axially oriented hole passing through the housing part is made or an axially oriented threaded hole, e.g., a blind hole, is made. An advantage is that simple stable mounting is possible. In addition, the dome regions are arranged as thickenings of the wall regions and thus increased stability is achievable. This is because the wall regions each connect the radially further inward cylindrical inner wall with the cuboid outer wall region.

According to example embodiments, the axial region covered by the cuboid outer wall includes the axial region covered by the cylindrical inner wall. An advantage is that the outer wall region completely surrounds the inner wall in the circumferential direction, e.g., radially. Since the outer wall region also overhangs the inner wall in the axial direction and in the opposite direction, the latter is arranged in a protected manner. After connecting the cover part and the flange part, the oil-filled interior is provided with increased safety.

According to example embodiments, a flange region, e.g., to which a driving electric motor can be connected, is formed on the housing part, and the interior region surrounded by the flange region opens through a recess into the interior region surrounded by the cylindrical inner wall. An advantage is that the inner wall has a recess. However, this recess is used to guide the driving shaft and the toothed part, e.g., the pinion, connected thereto in a rotationally fixed manner. The interior region surrounded by the flange region can thus also be at least partially filled with oil, but is also provided sealed off from the environment and from the motor.

According to example embodiments, the driving shaft of the gear system, which is driven by the electric motor, projects towards the driven wheel together with a toothed part, e.g., a pinion, which is connected to this shaft for conjoint rotation. For example, the toothing of the toothed part is in mesh with the toothing of the wheel, and, for example, the wheel is connected to the output shaft of the gear system for conjoint rotation. An advantage is that a driving motor can be connected directly to the gear system and thus forms a unit, i.e., a gearmotor, with the gear system.

According to example embodiments, a sealing ring is slid onto the annular protrusion of the cover part and is axially limited by the projections, e.g., by the end face of the projections. The sealing ring on its side axially facing away from the projections is axially limited by the cover part, e.g., such that the sealing ring is axially limited only at circumferential angular positions spaced from each other in the circumferential direction. An advantage is that the projections perform not only the function of increasing a stiffness, but also the function of axially limiting the sealing ring.

According to example embodiments, the maximum wall thickness of one or more of the projections measured in the circumferential direction has a local maximum as a function of the axial position and/or as a function of the distance to the sealing surface and/or to the sealing ring measured in the axial direction. For example, the axial position of this wall thickness maximum is located in the axial region which is covered by the toothed part, e.g., pinion, which is in engagement with the wheel and is connected to the driving shaft of the gear system for conjoint rotation. For example, the axis of rotation of the wheel is aligned perpendicular to and/or spaced from the axis of rotation of the toothed part. An advantage is that a wall thickness maximum in the axially central region allows high stiffness with low material cost.

For example, if this wall thickness maximum is located in the axial region which is covered by the toothed part, e.g., pinion, which is in engagement with the wheel and is connected to the driving shaft for conjoint rotation, vibrations of the housing part which could cause a change in the spacing between the pinion and the wheel are suppressed. Because the wall thickness maximum stabilizes the region of the housing part that is relevant for this.

According to example embodiments, the number of projections is more than seven. An advantage is that as little sagging of the sealing ring in the axial direction as possible is made possible.

According to example embodiments, the housing part including the cylindrical inner wall, the cuboid outer wall region, the dome regions, the wall regions, and the flange region are arranged in one piece, e.g., in one part. An advantage is that ready production is possible.

According to example embodiments, the space region surrounded by the cylindrical inner wall is at least partially filled with oil, and the space region present between the cylindrical inner wall and the cuboid outer wall region seals against the space region at least partially filled with oil and surrounded by the cylindrical inner wall. An advantage is that the interior region surrounded by the cylindrical inner wall can be filled with oil and thus the meshing toothings of the toothed part are lubricated with oil. The connection region of the housing part with the cover part is arranged radially outside the cylindrical inner wall and thus outside the oil region.

Further features and aspects of example embodiments of the present invention are explained in more detail below with reference to the appended schematic Figures.

DETAILED DESCRIPTION

Figure 1:
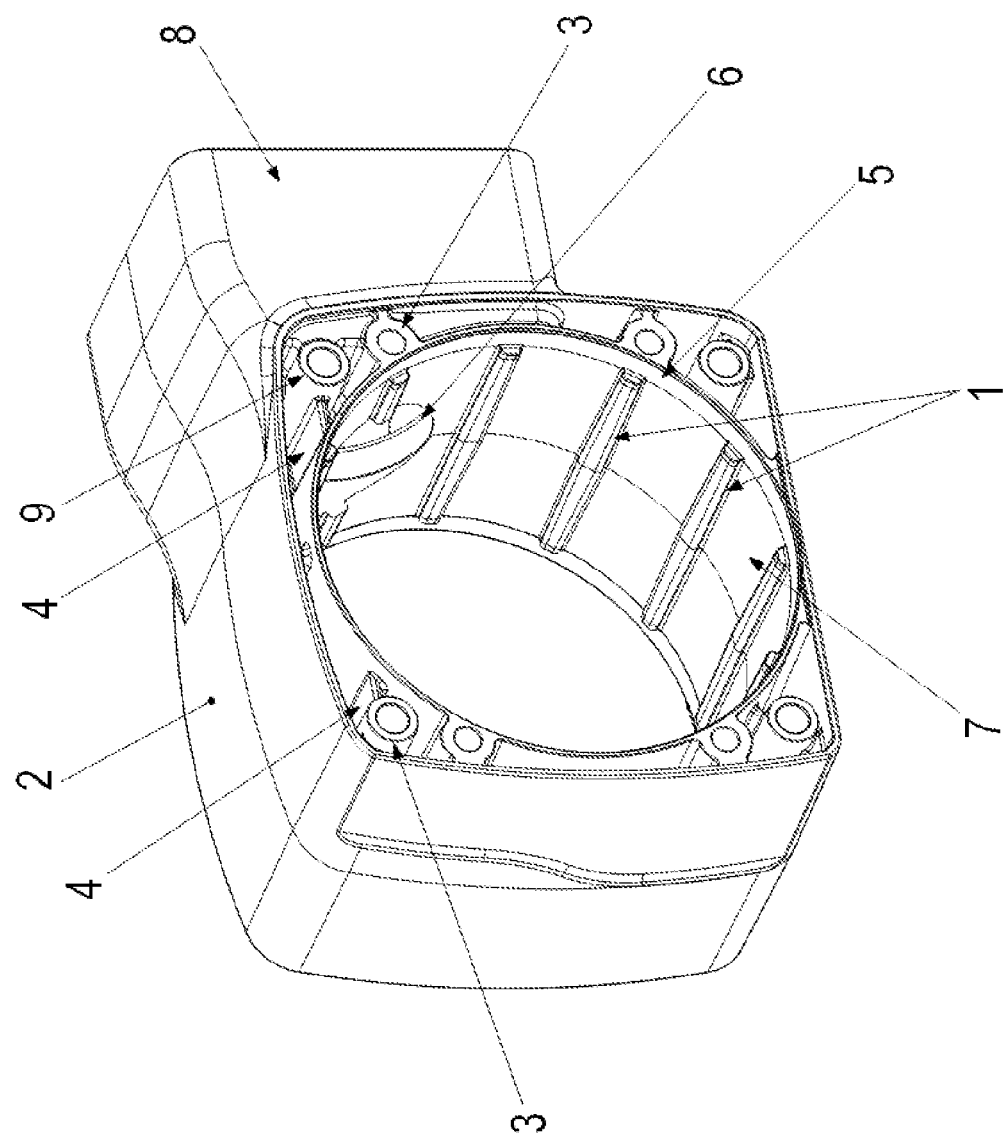
FIG. 1 is a perspective view of the housing part 2 of a gear system.
Figure 2:
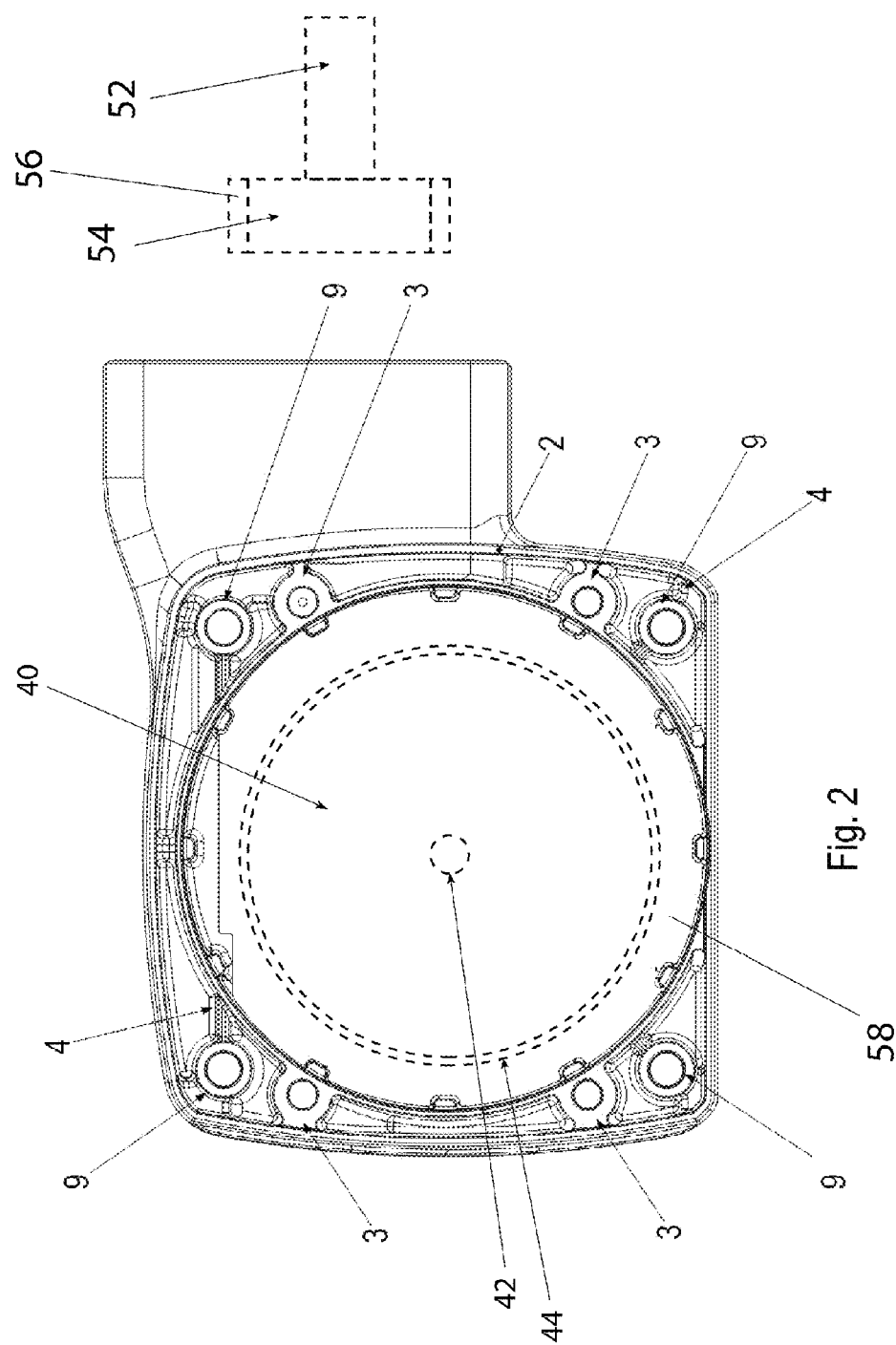
FIG. 2 is a top view of the housing part 2.
Figure 3:
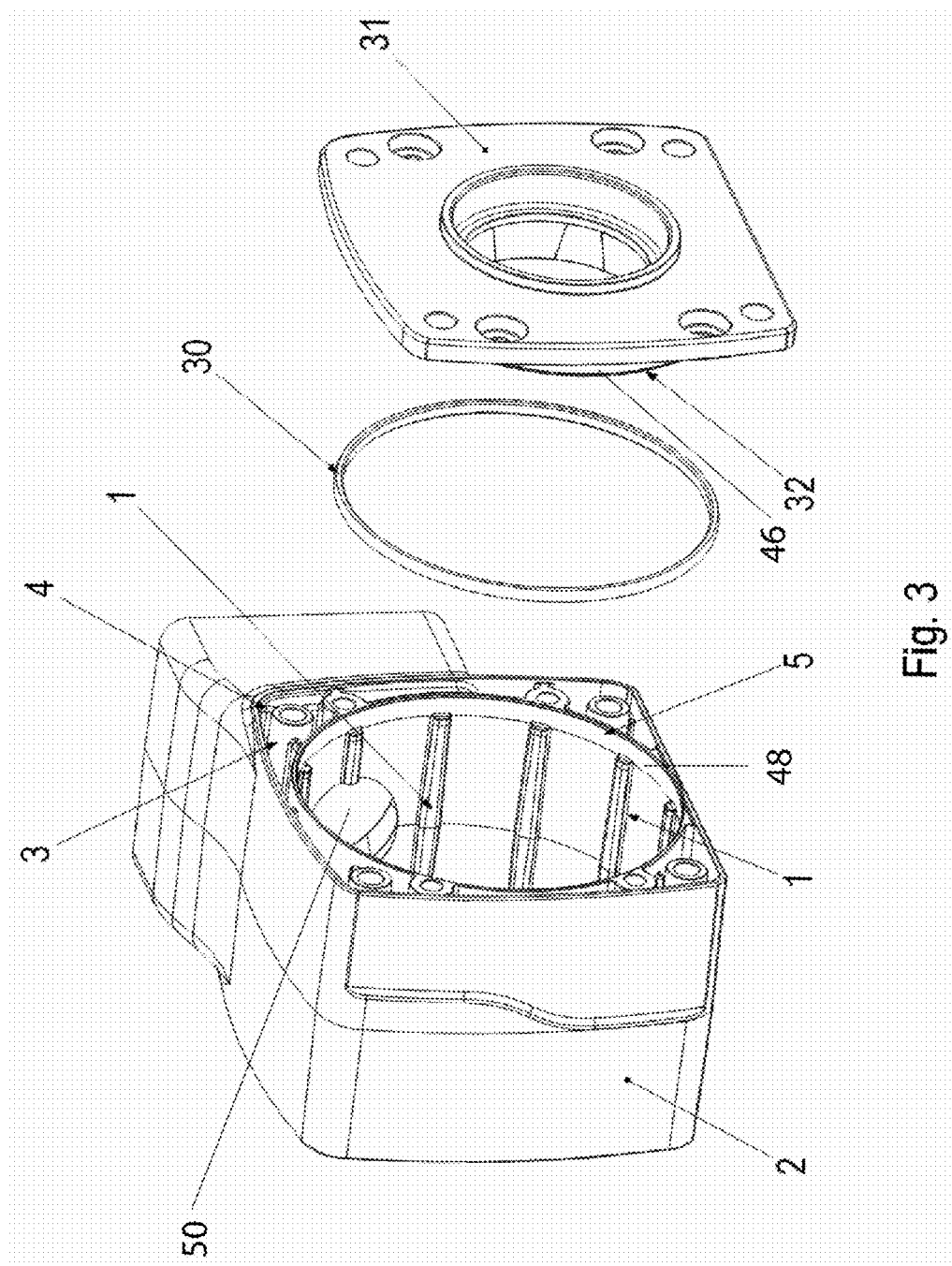
FIG. 3 is an exploded view of the housing part 2, a housing of the gear system having a sealing ring 30 and a cover part 32.
Figure 4:
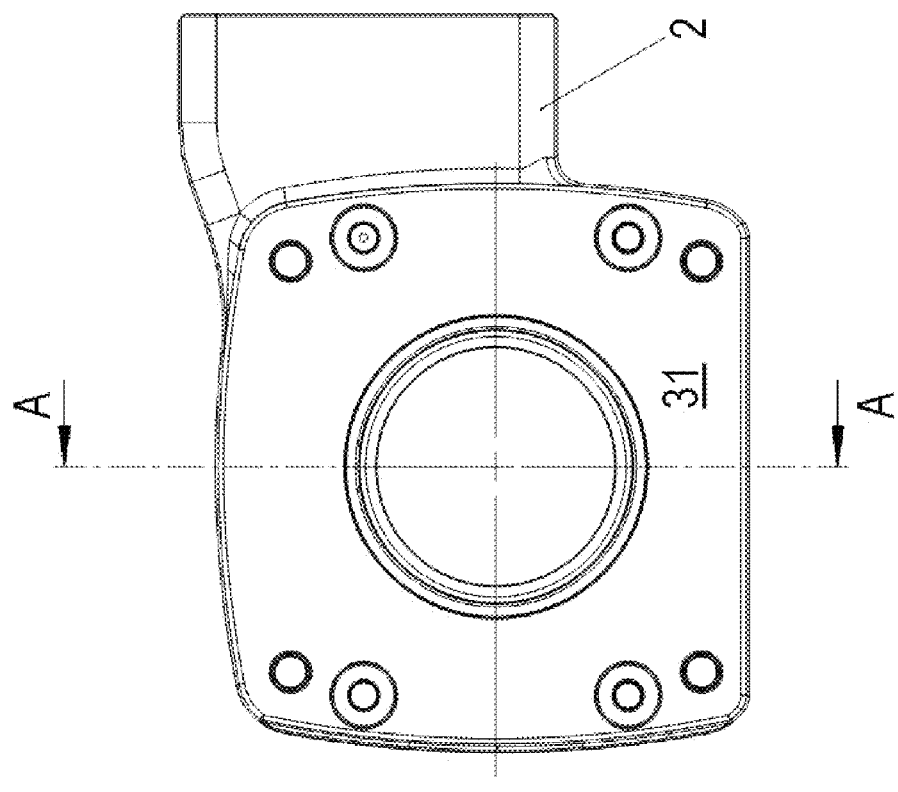
FIG. 4 is a cross-sectional view through the housing, in which, in addition to the cross-section, the cut surface orientation is illustrated in a side view of the housing.
Figure 4:
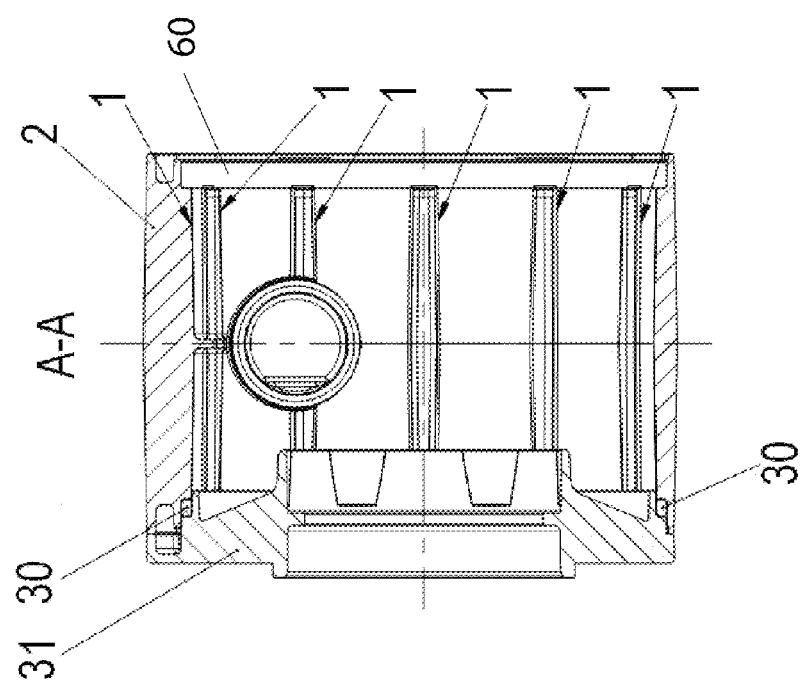

As illustrated in the Figures, the housing part 2 has a cuboid outer circumference and a cylindrical inner wall 7 which follows and surrounds the outer circumference of the driven gear.

Axially extending projections 1 are formed on this cylindrical inner wall 7, which project radially inward. These projections 1 are, for example, spaced from each other at regular intervals in the circumferential direction.

Thus, when the driven gear rotates, a swirling of the oil filled in the interior of the gear system and thus a reduced heat transfer resistance from the oil to the housing can be effected.

In addition, the cylindrical inner wall 7 can be arranged with a reduced wall thickness, since the projections 1 contribute to stiffening.

The cylindrical inner wall 7 is radially spaced from the cuboid outer circumference of the gear system, i.e., a cuboid outer wall region of the gear system.

For stable connection of the cylindrical inner wall 7 to the cuboid outer wall region, projection-shaped wall regions are formed which connect the cylindrical inner wall 7 to the cuboid outer wall region.

One of the wall regions 4 has a dome region 3, which is arranged as a thickening and in which an axially extending threaded hole is made.

A screw passing through a cover part 31 is screwed into this threaded hole, with the screw head of which the cover part 31 is pressed towards the housing part 2.

The dome region 3 is connected to both the cylindrical inner wall 7 and the cuboid outer wall region by wall regions 4.

For connecting a driving electric motor, the housing part 2 has a flange region 8 whose interior region 50 surrounded by the flange region 8 opens through a recess 6 into the interior region, e.g., space region 58, surrounded by the cylindrical inner wall 7.

Thus, the driving shaft 52, which is driven by the electric motor, projects towards the driven wheel 40 together with a toothed part 54, e.g., a pinion, which is connected to this shaft for conjoint rotation. The toothing 56 of the toothed part is in mesh with the toothing, e.g., toothed part 44 and/or gear, of the wheel 40. The wheel is connected to the output shaft 42 of the gear system for conjoint rotation.

The axial direction, circumferential direction, and radial distances always refer—unless explicitly described otherwise—to the axis of rotation of the driven shaft, which is aligned parallel and coaxial to the axis of symmetry of the cylindrical inner wall 7.

The projections 1 extend in the axial direction, so that their longest extension is in the axial direction.

The axis of rotation of the driving shaft is aligned perpendicular to the axis of rotation of the driven shaft and has a non-vanishing distance to the driven shaft.

A sealing surface 5, which is conical in shape, is also formed on the cylindrical inner wall 7. The axis of symmetry of the cone is oriented coaxially to the axis of rotation of the driven wheel.

An annular protrusion is formed on the cover part 31, which is also arranged in a conical shape and abuts the cone when the cover part 31 is placed on and connected to the housing part 2. For example, the annular protrusion has an outer conical surface region 46 that abuts an inner conical sealing surface 48.

A sealing ring 30 is slid onto the annular protrusion 32 and abuts the sealing surface 5, e.g., the cylindrical inner wall 7, after the cover part 31 has been placed on and connected to the housing part 2, so that the sealing ring 30 is pressed onto the housing part 2 by the cover part 31.

The sealing ring 30 is axially limited by the radially inwardly projecting projections in the circumferential angular regions covered by the respective projections. It is thus prevented from penetrating further axially. However, in the circumferential angular region present in the circumferential direction between the projections, an insignificant sagging is effected in the axial direction. However, tightness is ensured because the sealing ring 30 is elastically deformed between the annular protrusion 32 and the sealing surface 5 and therefore fits tightly.

The cover part 31 is thus connected to the cylindrical inner wall 7 in an oil-tight manner. Therefore, the space region 58 surrounded by the cylindrical inner wall 7 can be filled with oil. The space region 60 present between the cylindrical inner wall 7 and the cuboid outer wall region is thus sealed against the oil-filled space region 58 surrounded by the cylindrical inner wall 7.

The distance between the largest radial distance R of the wheel and the smallest clear radial distance of the projections 1 is, for example, less than 10% of the largest radial distance R of the wheel.

Some of the dome areas 9 are not provided with axially oriented threaded holes, but with axially through-going holes for the passage of tie rods, with which a flange cover arranged on the side of the housing part 2 facing away from the cover part 30 is connected to the housing part 2. Nuts are screwed axially onto the tie rods on both sides.

Radially outside the centering surface, a centering collar is formed on the housing part 2, which is brought into operative connection with a centering surface formed on the cover part, thus providing for the cover part to be centered towards the housing part 2.

In example embodiments, a different seal is used instead of the sealing ring 30.

The invention claimed is:

1. A gear system, comprising:
   a housing part including a cylindrical inner wall radially surrounding a wheel connected to an output shaft of the gear system for conjoint rotation, projections being arranged on the cylindrical inner wall, the projections being spaced from each other in a circumferential direction, projecting radially inwardly, and extending axially;
   wherein a sealing surface adjoins the cylindrical inner wall and is arranged as a conical surface section.

2. The gear system according to claim 1, wherein the wheel includes a toothed part.

3. The gear system according to claim 1, wherein the projections are spaced from each other at regular intervals.

4. The gear system according to claim 1, wherein the projections are longer in an axial direction than in the circumferential direction and in a radial direction.

5. The gear system according to claim 1, wherein an axis of rotational symmetry of the conical surface section is aligned coaxially to an axis of rotation of the output shaft.

6. The gear system according to claim 1, wherein a region covered by the projections in an axial direction adjoins or is spaced from a region covered by the sealing surface in the axial direction.

7. The gear system according to claim 6, wherein the region covered by the projections in the axial direction does not overlap with the region covered by the sealing surface in the axial direction.

8. The gear system according to claim 1, wherein a cover part of the gear system includes an annular protrusion, the cover part being connected to the housing part, the annular protrusion abutting the sealing surface.

9. The gear system according to claim 8, wherein the annular protrusion includes a conical surface region.

10. The gear system according to claim 9, wherein the annular protrusion has an outer conical surface region that abuts an inner conical sealing surface, an axis of rotational symmetry of the outer conical surface region being aligned coaxially to an axis of rotational symmetry of the inner conical sealing surface.

11. The gear system according to claim 8, wherein a sealing ring arranged on the annular protrusion of the cover part is axially limited by the projections and/or by an end face of the projections, the sealing ring, on a side axially facing away from the projections, is axially limited by the cover part.

12. The gear system according to claim 11, wherein the sealing ring is axially limited only at circumferential angular positions spaced from each other in a circumferential direction.

13. The gear system according to claim 1, wherein the housing part includes a flange region, an interior region surrounded by the flange region opens through a recess into an interior region surrounded by the cylindrical inner wall.

14. The gear system according to claim 13, wherein the flange region is connectable to a driving electric motor.

15. The gear system according to claim 1, wherein a driving shaft of the gear system, drivable by an electric motor, projects toward a driven wheel together with a toothed part connected to the driving shaft for conjoint rotation.

16. The gear system according to claim 15, wherein a toothing of the toothed part meshes with a toothing of the wheel.

17. The gear system according to claim 1, wherein at least one of the projections has a maximum wall thickness measured in the circumferential direction located at an axial position and/or at a distance to a sealing surface and/or to a sealing ring measured in an axial direction.

18. The gear system according to claim 17, wherein the axial position of the maximum wall thickness is located in an axial region covered by a toothed part that is in engagement with the wheel and is connected to a driving shaft of the gear system for conjoint rotation.

19. The gear system according to claim 1, wherein the gear system includes more than seven projections.

20. A gear system, comprising:
   a housing part including a cylindrical inner wall radially surrounding a wheel connected to an output shaft of the gear system for conjoint rotation, projections being arranged on the cylindrical inner wall, the projections being spaced from each other in a circumferential direction, projecting radially inwardly, and extending axially;

wherein the cylindrical inner wall is radially surrounded by a cuboid outer wall of the housing part, wall portions being arranged between the cylindrical inner wall and the cuboid outer wall, the wall portions being connected to the cylindrical inner wall and being connected to the cuboid outer wall.

21. The gear system according to claim 20, wherein a radial distance between the cylindrical inner wall and the cuboid outer wall is variable and/or periodically variable in a circumferential direction between zero and a maximum value.

22. The gear system according to claim 20, wherein first ones of the wall portions include first dome areas, each dome area including a hole arranged as an axially oriented hole passing through the housing part, an axially oriented threaded hole, or an axially oriented threaded blind hole.

23. The gear system according to claim 20, wherein an axial region covered by the cuboid outer wall includes an axial region covered by the cylindrical inner wall.

24. A gear system, comprising:
a housing part including a cylindrical inner wall radially surrounding a wheel connected to an output shaft of the gear system for conjoint rotation, projections being arranged on the cylindrical inner wall, the projections being spaced from each other in a circumferential direction, projecting radially inwardly, and extending axially;
wherein at least one of the projections has a maximum wall thickness measured in the circumferential direction located at an axial position and/or at a distance to a sealing surface and/or to a sealing ring measured in an axial direction;
wherein the axial position of the maximum wall thickness is located in an axial region covered by a toothed part that is in engagement with the wheel and is connected to a driving shaft of the gear system for conjoint rotation; and
wherein an axis of rotation of the wheel is aligned perpendicular to and/or spaced from an axis of rotation of the toothed part and/or the pinion.

25. A gear system, comprising:
a housing part including a cylindrical inner wall radially surrounding a wheel connected to an output shaft of the gear system for conjoint rotation, projections being arranged on the cylindrical inner wall, the projections being spaced from each other in a circumferential direction, projecting radially inwardly, and extending axially;
wherein the housing part including the cylindrical inner wall, a cuboid outer wall region, dome regions, wall regions, and a flange region is arranged as an integral part.

26. A gear system, comprising:
a housing part including a cylindrical inner wall radially surrounding a wheel connected to an output shaft of the gear system for conjoint rotation, projections being arranged on the cylindrical inner wall, the projections being spaced from each other in a circumferential direction, projecting radially inwardly, and extending axially;
wherein a space region surrounded by the cylindrical inner wall is at least partially filled with oil, a space region between the cylindrical inner wall and a cuboid outer wall region sealing against the space region at least partially filled with oil and surrounded by the cylindrical inner wall.

* * * * *